UNITED STATES PATENT OFFICE.

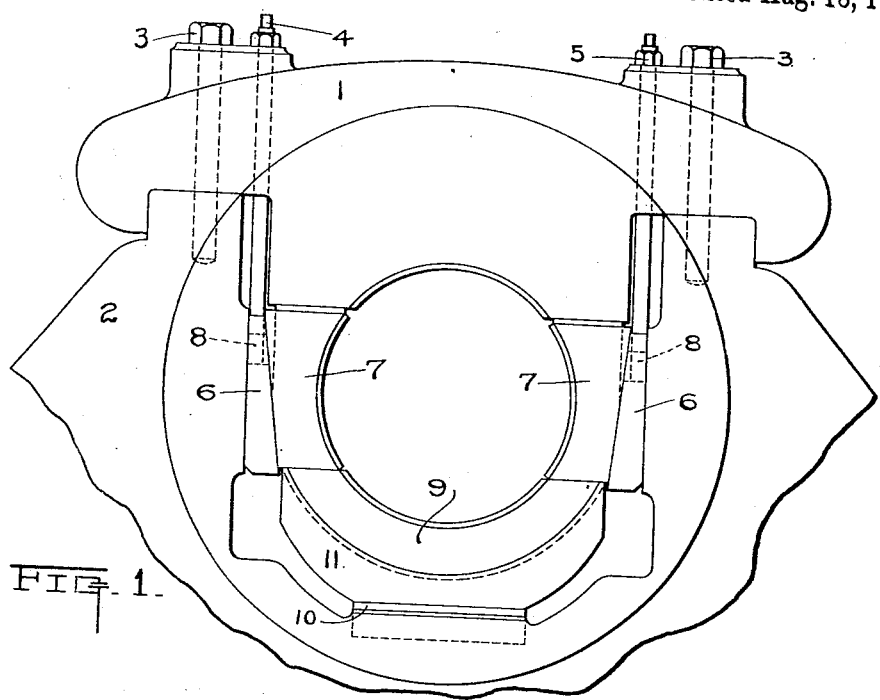
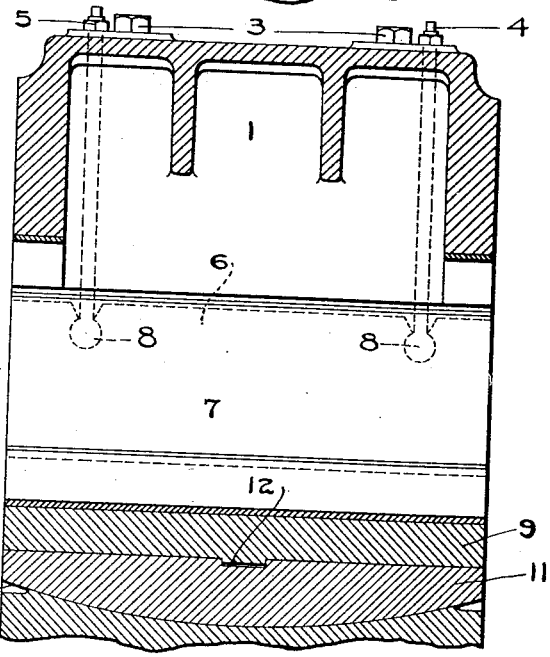

FREDERICK LEWIS WEBSTER, OF SEATTLE, WASHINGTON, ASSIGNOR, BY MESNE ASSIGNMENTS, TO ALLIS-CHALMERS MANUFACTURING COMPANY, A CORPORATION OF DELAWARE.

SHAFT-BEARING.

1,108,042.    Specification of Letters Patent.    Patented Aug. 18, 1914.

Application filed December 30, 1910. Serial No. 600,118.

*To all whom it may concern:*

Be it known that I, FREDERICK L. WEBSTER, a subject of the King of Great Britain, residing at Seattle, in the county of King and State of Washington, have invented certain new and useful Improvements in Shaft-Bearings, of which the following is a specification.

This invention relates to improvements in the construction of bearings for shafts which are subject to deflection.

The object of the invention is to provide a bearing for shafting which is simple in construction and which will readily accommodate itself for deflection of the shaft and side adjustment of the bearing. As heretofore constructed, bearings for permitting shaft deflections have been formed with spherical surfaces between the elements moving relative to each other during deflection of the shaft. It has been very difficult to form such spherical surfaces so as to obtain uniform coaction between the bearing elements. With the present invention the use of spherical bearing surfaces is avoided, only cylindrical and flat surfaces being formed between the bearing elements.

A clear conception of one embodiment of the invention can be obtained by referring to the accompanying drawing in which like reference characters designate the same or similar parts in the different views.

Figure 1 is an end elevation of a bearing showing also a fragment of the frame in which it is supported. Fig. 2 is a transverse central vertical section of the device shown in Fig. 1.

The bearing, shown in the drawing, consists essentially of a lower or bottom shell 9, two side shells 7, a bearing cap 1 and supporting frame 2. The bottom and side shells 9, 7, are lined, as usual, with suitable bearing material, such as babbitt. The cap 1, also babbitted, does not rest firmly against the shaft, not shown, which while in its normal position rests by gravity upon the bottom shell 9 and side shells 7. The lower or bottom shell 9 is cylindrical at the bottom and rests upon a cylindrical upper surface of an intermediate supporting plate or shell 11 and is prevented from end or longitudinal displacement on the shell 11 by means of a circumferential outwardly projecting flange or ridge 12 on the shell 9 which fits into a correspondingly formed recess in the intermediate shell 11. The axis of curvature of the upper cylindrical surface of the shell 11 and the lower cylindrical surface of bottom shell 9 coincides with the axis of the shaft. The lower surface 10 of the intermediate shell 11 is also formed cylindrical, having for its axis of curvature a line perpendicular to the shaft axis and lying some distance above the central axis of the shaft. The shell 11 rests with this cylindrical surface 10 upon a correspondingly formed cylindrical surface of the supporting frame 2, the shell 11, however, being free to move along the curved surface of the supporting frame 2, to permit longitudinal tilting of the shaft.

Wedges 6 are inserted between each of the side shell 7 and vertical side surfaces formed on the supporting frame 2. These wedges 6 are suspended from cylindrical enlargements 8 formed at the lower ends of the suspension bolts 4. The suspension bolts 4, which as shown are two in number for each side shell 7, pass upwardly through the bearing cap 1 and are held in position by means of nuts 5 coacting with the bolts 4 and with the upper surface of the cap 1. The bearing cap 1 is connected to the supporting frame 2 by means of bolts 3 or any other suitable means, and is spaced from the side shells 7 for insertion of wood shims.

During normal operation, the supported shaft, as heretofore stated, finds bearing along the upper surface of the lower or bottom shell 9 and the inner surfaces of the side shells 7, the parts being just loose enough to permit free rotation of the shaft therein. If for any reason, such as wearing of the surfaces of the side shell 7, the clearance between the shaft and side shell 7 should become too great, it is necessary only to raise either one or both of the wedges 6 by means of a wrench applied to the nuts on the upper ends of the suspension bolts 4.

If for any reason it is desired to shift the shaft slightly transversely within its bearing, this can be done by lowering one of the wedges 6 and raising the other wedge 6. During such lateral shifting, the bottom shell 9 and the intermediate shell 11 will shift slightly transversely the cylindrical surface 10 of the shell 11 riding on the corresponding surface of the supporting frame 2.

In case deflection occurs in the shaft, the axis thereof being tilted slightly downward by such deflection, the lower shell 9 and intermediate shell 11 will tilt correspondingly along the cylindrical surface 10 formed on the lower side of the intermediate shell 11, thus adjusting the bearing surface of the lower shell 9 to conform with the lower bearing surface of the shaft. It will be noted that during deflection of the shaft, however, the side shell 7 should also tilt slightly forward. Such slight tilting of the side shell 7 is permitted since the bearing cap 1 is spaced from the upper surfaces of these side shells. The wedges may also tilt slightly on their rear surfaces. The surfaces of the side shells 7 coacting with the wedges may be made parallel to permit tilting of the side shells on the wedges at these surfaces and the surfaces of the frame coacting with the wedges must then be inclined to each other corresponding to the wedge taper.

It should be understood that it is not desired to be limited to the exact details of construction shown and described, for obvious modifications will occur to a person skilled in the art.

It is claimed and desired to secure by Letters Patent,—

1. In a shaft bearing, a shell having a convex cylindrical bearing surface the axis of which extends transverse to the shaft and having a second cylindrical bearing surface spaced from the shaft and generated about an axis which extends longitudinally of the shaft, and a frame coacting with said first-mentioned cylindrical surface.

2. In a shaft bearing, a shell having a convex cylindrical bearing surface the axis of which extends at right angles to the shaft and having a second cylindrical bearing surface spaced from the shaft and generated about an axis which extends longitudinally of the shaft, and a frame coacting with said first-mentioned cylindrical surface.

3. In a shaft bearing, a shell having a cylindrical bearing surface the axis of which lies above and extends transverse to the shaft axis and having a second cylindrical bearing surface spaced from the shaft and generated about an axis which extends longitudinally of the shaft, and a frame coacting with said first-mentioned cylindrical surface.

4. In a shaft bearing, a shell having a pair of cylindrical bearing surfaces the axis of one of which extends longitudinally of the shaft and the axis of the other of which extends transverse to the shaft, both of said surfaces being spaced from the shaft, and a frame coacting with one of said cylindrical surfaces.

5. In a shaft bearing, a plurality of shells coacting with each other along a cylindrical surface generated about an axis extending longitudinally of the shaft, one of said shells having a second cylindrical surface with an axis transverse to the shaft axis, and a frame coacting with said second surface.

In testimony whereof, I affix my signature in the presence of two witnesses.

FREDERICK LEWIS WEBSTER.

Witnesses:
GEO. A. DROSTE,
GEO. T. HENDERSON.